(12) United States Patent
Gupta et al.

(10) Patent No.: US 9,910,774 B1
(45) Date of Patent: Mar. 6, 2018

(54) SPONTANEOUS RECONFIGURATION OF DATA STRUCTURES USING BALLOON MEMORY ALLOCATION

(71) Applicant: Nutanix, Inc., San Jose, CA (US)

(72) Inventors: Karan Gupta, San Jose, CA (US); Kamalneet Singh, Bangalore (IN); Manosiz Bhattacharrya, San Jose, CA (US); Rajiv Mirani, Los Gatos, CA (US)

(73) Assignee: Nutanix, Inc., San Jose, CA (US)

( * ) Notice: Subject to any disclaimer, the term of this patent is extended or adjusted under 35 U.S.C. 154(b) by 93 days.

(21) Appl. No.: 14/985,268

(22) Filed: Dec. 30, 2015

(51) Int. Cl.
| | |
|---|---|
| *G06F 12/00* | (2006.01) |
| *G06F 12/06* | (2006.01) |
| *G11C 7/10* | (2006.01) |
| *G06F 12/128* | (2016.01) |
| *G06F 12/02* | (2006.01) |
| *G06F 9/455* | (2018.01) |

(52) U.S. Cl.
CPC ...... *G06F 12/0646* (2013.01); *G06F 9/45558* (2013.01); *G06F 12/023* (2013.01); *G06F 12/128* (2013.01); *G11C 7/1072* (2013.01); *G06F 2009/45579* (2013.01); *G06F 2009/45583* (2013.01); *G06F 2212/1044* (2013.01); *G06F 2212/69* (2013.01)

(58) Field of Classification Search
CPC .. G06F 12/0646; G06F 12/023; G06F 12/128; G06F 12/0238; G06F 12/0246; G06F 12/0253; G06F 12/08; G06F 12/0802; G06F 12/0806; G06F 12/1458; G06F 12/1466; G06F 12/1475; G06F 9/45558; G06F 2009/45579; G06F 2009/45583; G06F 2212/1044; G06F 2212/69; G11C 7/1072
See application file for complete search history.

(56) References Cited

U.S. PATENT DOCUMENTS

| | | | |
|---|---|---|---|
| 8,601,473 | B1 | 12/2013 | Aron et al. |
| 8,949,295 | B2 | 2/2015 | McDougall et al. |
| 2008/0222380 | A1* | 9/2008 | Sze ...................... G06F 12/023 711/170 |
| 2011/0145473 | A1* | 6/2011 | Maheshwari ....... G06F 12/0866 711/103 |

* cited by examiner

*Primary Examiner* — Shawn X Gu
(74) *Attorney, Agent, or Firm* — Vista IP Law Group, LLP

(57) ABSTRACT

Systems for memory management in virtual machines. A method embodiment forms a reconfigurable multi-level data structure by requesting reserved memory as well as loaned-out memory. The method configures the multi-level data structure to have a first area comprising reserved memory and having a second area comprising reconfigurable memory. The reserved memory portion of the data structure is populated with pointers that address one or more portions of the second area. During operation, the method receives a request to release some or all of the reconfigurable memory. Memory address pointers in the first portion of the multi-level data structure are modified to reflect the release of the reconfigurable memory. In a hypervisor-based virtual machine environment, the first area comprising reserved memory can be allocated via a hypervisor call. The second area comprising reconfigurable memory is allocated via a balloon memory driver call.

20 Claims, 15 Drawing Sheets

US 9,910,774 B1

SPONTANEOUS RECONFIGURATION OF DATA STRUCTURES USING BALLOON MEMORY ALLOCATION

FIELD

This disclosure relates to high-performance memory management in virtual machines, and more particularly to techniques for spontaneous reconfiguration of data structures using dynamically-allocated balloon memory.

BACKGROUND

Computing clusters often host nodes having instances of virtual machines that request and receive resources from a hypervisor. In some situations, such virtual machines can know a priori the extent of resources (e.g., memory) that are needed to carry out the intended function of the virtual machine. In other cases, however a virtual machine might not know a priori the extent of memory resources needed to provide the intended function and/or to perform at a particular level of performance. For example, a virtual machine that provides services (e.g., shared storage access) to a group of user virtual machines might need a small amount of memory resources (e.g., to implement a small caching subsystem) or might need a large amount of memory (e.g., to implement a large caching subsystem). Techniques that perform an a priori allocation of a very large segment of memory in order to handle very large memory needs (e.g., very large caches) are deficient at least in that the large memory allocation depletes memory resources from other virtual machines that might advantageously avail themselves of the memory resources. Techniques that perform an a priori allocation of too small of a memory segment is deficient at least in that the intended function ceases or performance suffers when the too-small of a segment of allocated memory becomes fully consumed during operation.

In some computing clusters, a hypervisor can loan out portions of memory to a requesting virtual machine under the proviso that the loaned out memory will be returned by the requesting virtual machine immediately upon demand by the hypervisor. Such a loan-out agreement between a hypervisor and a requesting virtual machine can serve to improve memory resource utilization, however the requirements that the loaned out memory will be returned by the requesting virtual machine immediately upon demand by the hypervisor are often too onerous for many applications, at least inasmuch as nearly instantaneous reconfiguration of memory uses upon return of the loaned out memory to the hypervisor presents a severe constraint to efficient use of the overall memory resources.

What is needed is a technique or techniques for on-demand spontaneous reconfiguration of virtual machine memory subsystems that advance over legacy approaches to overcome the deficiencies of legacy techniques.

SUMMARY

The present disclosure provides a detailed description of techniques used in systems, methods, and in computer program products for spontaneous reconfiguration of ephemeral data structures using balloon memory allocation. Further details of aspects, objectives, and advantages of the technological embodiments are described herein and in the following descriptions, drawings, and claims.

BRIEF DESCRIPTION OF THE DRAWINGS

The drawings described below are for illustration purposes only. The drawings are not intended to limit the scope of the present disclosure.

DETAILED DESCRIPTION

Figure 1A:
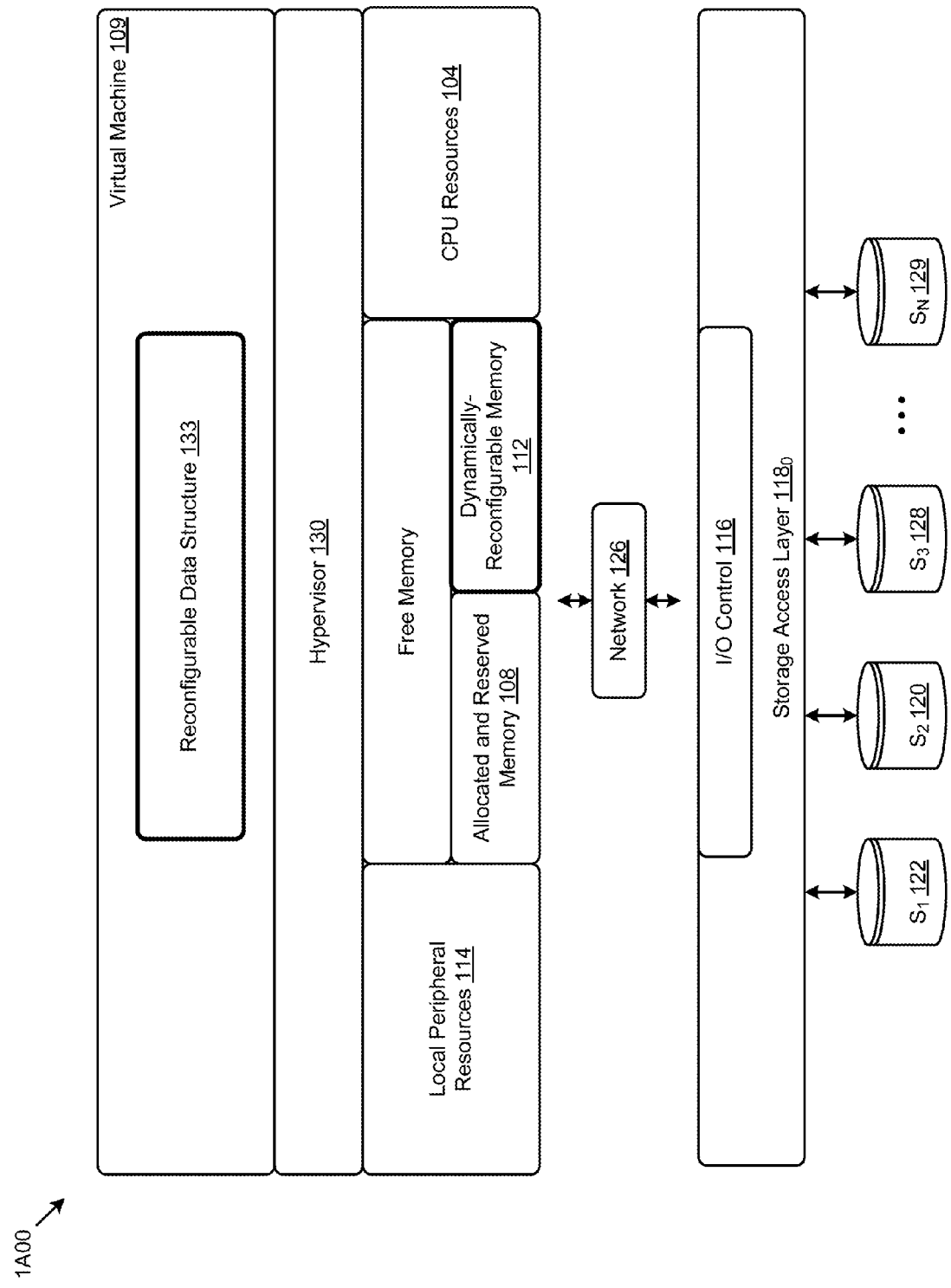
FIG. 1A exemplifies a virtual machine environment hosting a virtual machine that provides high-performance ephemeral data structure configuration and reconfiguration, according to an embodiment.

Some embodiments of the present disclosure address the problem of how to use provisionally-allocated memory in a virtual machine and some embodiments are directed to approaches for performing spontaneous reconfiguration of ephemeral data structures such as a content cache using provisionally-allocated memory. More particularly, disclosed herein and in the accompanying figures are exemplary environments, systems, methods, and computer program products for spontaneous reconfiguration of ephemeral data structures using balloon memory allocation.

Overview

In many computing situations, the contents or extent of a data structure might be used in fact, or might not be used in fact. The determination as to if the data or extent is to be used or not may depend on the nature of the data, and/or on real-time conditions present during processing. For example a computing process may intend to use an area of memory process a huge amount of data to determine a statistical result or threshold. Part way through the processing however, the statistical result or threshold might become known within a particular degree of certainty and/or the threshold might be met. In such as case, areas of previously allocated memory can become no longer needed, and can be repurposed. As another example, real-time conditions might predict that a large amount of memory is needed to capture real-time events, and accordingly a large area of memory is allocated. However, the real-time prediction might have been wrong, and it can thus turn out that the large area of allocated memory becomes unneeded. In such cases, it might be expeditions to use memory that is merely loaned-out rather than memory that is permanently-allocated or pinned. Using techniques as disclosed herein, a data structure or portion thereof can be formed using an ephemeral memory data structure (e.g., using loaned-out memory that can be returned to the lender). The loaned-out memory can be returned at any moment in time. Discussed herein are methods for managing reconfigurable data structures using dynamically loaned-out portions of memory.

In one operating scenario, a virtual machine requests a segment of loaned-out memory from a hypervisor (e.g., using a hypervisor call). A multi-level data structure is initially configured to have a first area of memory that is pinned or otherwise allocated for ongoing use by the requestor (e.g., reserved memory). Second areas of the multi-level data structure are populated using loaned-out memory (e.g., reconfigurable memory). The pinned memory serves to store entry points (e.g., addresses) of the loaned-out portions (e.g., the multi-level data structure is populated with memory address pointers to the second areas). Any portions of the second areas of the multi-level data structure are composed of the loaned-out memory. The virtual machine might receive a request to return some or all of the loaned-out portions of memory, and before doing so, the virtual machine reconfigures the memory address pointers in the first area to reflect the return of loaned-out portions of memory that were used to form the second areas of the multi-level data structure.

Various embodiments are described herein with reference to the figures. It should be noted that the figures are not necessarily drawn to scale and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment. An aspect or an advantage described in conjunction with a particular embodiment is not necessarily limited to that embodiment and can be practiced in any other embodiments even if not so illustrated. Also, reference throughout this specification to "some embodiments" or "other embodiments" refers to a particular feature, structure, material, or characteristic described in connection with the embodiments as being included in at least one embodiment. Thus, the appearance of the phrases "in some embodiments" or "in other embodiments" in various places throughout this specification are not necessarily referring to the same embodiment or embodiments.

Definitions

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Reference is now made in detail to certain embodiments. The disclosed embodiments are not intended to be limiting of the claims.

DESCRIPTIONS OF EXEMPLARY EMBODIMENTS

FIG. 1A exemplifies a virtual machine environment 1A00 hosting a virtual machine that provides high-performance ephemeral data structure configuration and reconfiguration. As shown, a virtual machine 109 operates using services of a hypervisor 130. The hypervisor has privileged access to a range of resources accessible from within virtual machine environment 1A00. In particular, and as shown, the hypervisor has access to processors such single- or multi-core processors and or any other computing resources (e.g., see CPU resources 104). Additionally, the hypervisor has access to local peripheral resources 114, which may include clocks, timers, transducers, and solid-state storage devices (SSD).

In this logical layout, the hypervisor is situated between the resources and user-consumers of such resources. The hypervisor manages memory by performing memory management tasks such as memory allocation and memory release, memory coalescing, memory garbage collection, etc.). In "bare metal" operation, the hypervisor serves memory requests by determining the availability of memory (e.g., availability of a contiguously-addressed memory segment or availability of multiple memory segments) corresponding to a request. The hypervisor satisfies the request by establishing the memory segment or segments as allocated and returning the base address and range of the memory segment or segments to the requestor. The base address and range of the memory segment or segments are used by the requestor to store data into a data structure (e.g., see reconfigurable data structure 133). Such a data structure can be used for in-memory storage of data. Some memory management techniques regard allocated memory as allocated and reserved (see allocated and reserved memory 108) such that the hypervisor will neither re-use any allocated and reserved memory until it has been released by the requestor at the requestor's own election, nor will the hypervisor ask the requestor of allocated and reserved memory to release the allocated and reserved memory. In some cases a requestor (e.g., a virtual machine) may have data that is ephemeral. For example, a use case or algorithm might process data in a systolic fashion, by bringing in a relatively large portion of data, and reducing it to a smaller portion (e.g., by filtering, or selection, or rejection). In some cases the memory segment used for in-memory storage of the relatively large portion of data might be re-used. In other cases it might be deemed to be unneeded for further processing, and can be returned to the hypervisor. As is discussed herein, some hypervisors support two memory management techniques that implement dynamic allocation, whereby the requestor can ask the hypervisor to allocate a segment of memory that might be allocated merely as a "loaned memory segment". Any such loaned memory segments can be within a contiguous address space, or can be dispersed through multiple address ranges. In this embodiment, the hypervisor manages a logically contiguous range of loanable memory (see dynamically-reconfigurable memory 112), and such loanable memory can be used by a requestor for data structures or portions thereof that might be used in ephemeral memory use cases. The hypervisor can manage any number of segments of pinned memory (e.g., allocated and reserved memory) and the hypervisor can manage any number of segments of dynamically-reconfigurable memory. Requests for dynamically-reconfigurable memory 112 can be satisfied from the dynamically-reconfigurable memory area, as shown. The requestor determines (e.g., based on the intended use of the memory) whether to request allocated and reserved memory 108 or whether to request dynamically-reconfigurable memory. If the requestor has requested a portion of dynamically-reconfigurable memory, the hypervisor may at any time initiate a release protocol such that the hypervisor will expect the requestor to release some or all of the previously negotiated portions of dynamically-reconfigurable memory 112.

In operation, especially to address performance-affecting conditions, the hypervisor may request release of previously negotiated portions of dynamically-reconfigurable memory 112. For performance reasons, the hypervisor expects that the turnaround time between a hypervisor request for return of previously negotiated portions of dynamically-reconfigurable memory 112 and the actual release of the previously negotiated portions of dynamically-reconfigurable memory is on the order of one operating system context switch event (e.g., a few or tens of microseconds). Under such tight timing constraints, the uses for dynamically-reconfigurable memory is limited. Bulk copy from the dynamically-reconfigurable memory segment to another memory segment is sometimes possible, but is not always able to be completed within the aforementioned timing constraints. Bulk copy from the dynamically-reconfigurable memory segment to paging locations (e.g., to storage devices $S_1$ 122, $S_2$ 120, $S_3$ 128, . . . $S_N$ 129) is sometimes possible, but is generally even slower than memory-to-memory copies and, thus the needed nearly instantaneous completion a memory content save using that option is not necessarily guaranteed. Especially in the situation that storage devices are networked (e.g., accessible over a network 126 or through a storage access layer $118_0$), nearly instantaneous return of the dynamically-reconfigurable memory segments after saving to a storage device is often not likely. In some cases, access to storage areas on storage devices through a storage access layer $118_0$ is very fast, yet fast access to such areas are not necessarily guaranteed.

Further details regarding a general approach to managing networked storage in a cluster are described in U.S. Pat. No. 8,601,473 titled, ARCHITECTURE FOR MANAGING I/O AND STORAGE FOR A VIRTUALIZATION ENVIRONMENT, which is hereby incorporated by reference in its entirety.

In some situations, dynamically-reconfigurable memory segments can be used to implement portions of an ephemeral data structure such as is present in some caching subsystems. Specifically, the dynamically-reconfigurable memory segments that are managed by the hypervisor can be used to implement one or more portions of a reconfigurable data structure 133. As such, when the hypervisor expects or demands that the requestor immediately release some or all of the previously negotiated portions of dynamically-reconfigurable memory 112, the hypervisor's request can be satisfied by reconfiguring the reconfigurable data structure to no longer use the dynamically-reconfigurable memory segments. The effect on the reconfigurable data structure is that the data that was stored in the dynamically-reconfigurable memory segments is no longer guaranteed to be present for any further time duration. In some use cases this may have a negligible effect on overall processing. For example, in the use case where the dynamically-reconfigurable memory segments are used in a cache subsystem, the effect on the cache is that those entries in the cache that were stored in the dynamically-reconfigurable memory segments of the memory cache are no longer accessible from the cache—since the released dynamically-reconfigurable memory segments have been or are in the process of being returned to the hypervisor. In operation, a cache access request for one of those entries through the cache would result in a cache MISS. Often, the effect of a cache MISS, or even a series of cache MISS events, is much less deleterious to system performance than any delay of a virtual machine return of dynamically-reconfigurable memory segments to the hypervisor on demand. Strictly as one example of such a deleterious effect, failure of any virtual machine to return the demanded dynamically-reconfigurable memory segments to the hypervisor might cause the hypervisor to begin paging, thus deleteriously affecting overall node performance.

One possible implementation of a memory cache subsystem involves using dynamically-reconfigurable memory segments to implement one or more tiers of a multi-tier cache within a controller virtual machine. Such an embodiment is shown and discussed as pertains to FIG. 1B FIG. 1B exemplifies a virtual machine environment 1B00 hosting a controller virtual machine $110_1$ that provides high-performance storage access to user virtual machines through use of a memory caching subsystem. As an option, one or more variations of virtual machine environment 1B00 or any aspect thereof may be implemented in the context of the architecture and functionality of the embodiments described herein. Also, the virtual machine environment 1B00 or any aspect thereof may be implemented in any environment.

Figure 1B:
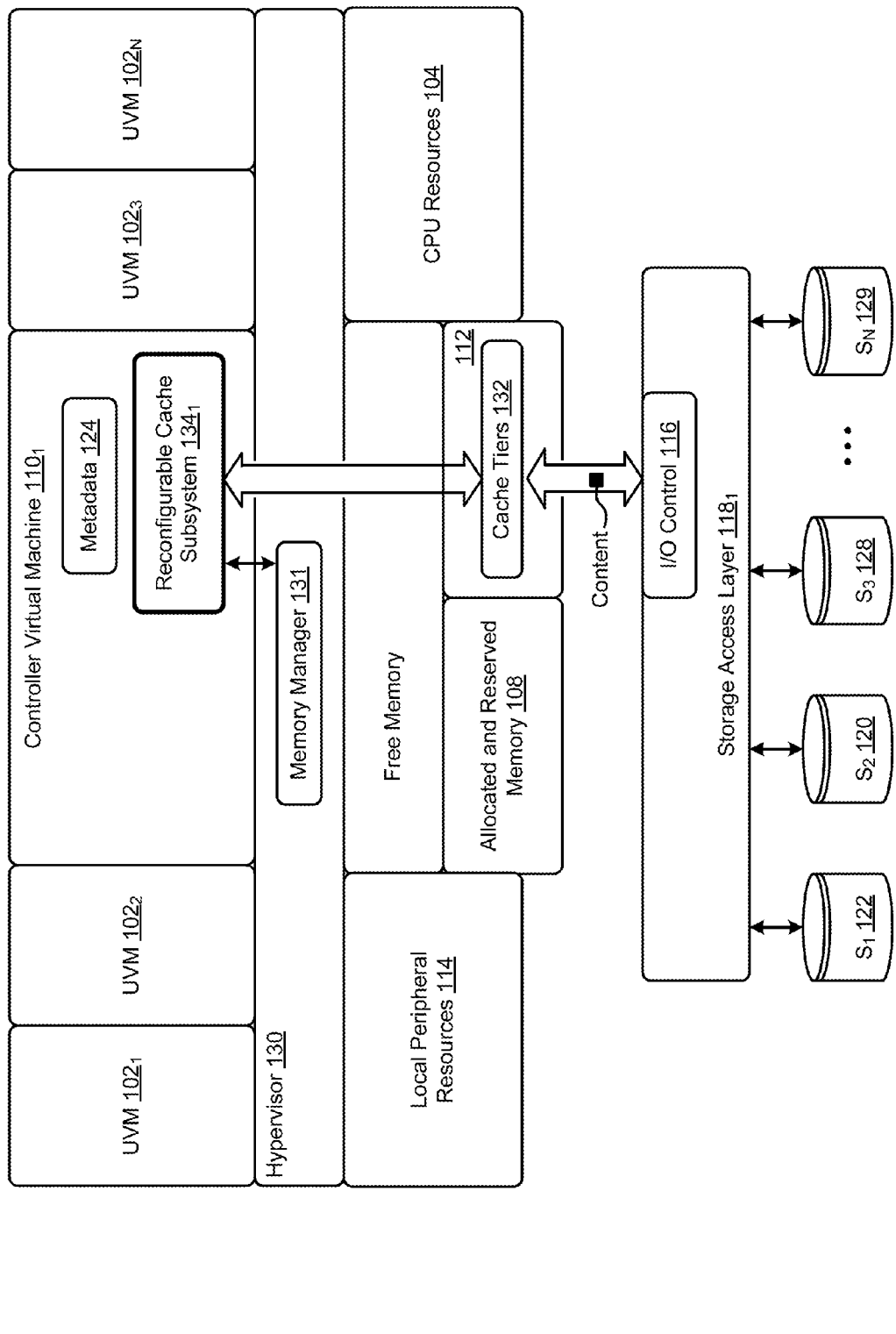
FIG. 1B exemplifies a virtual machine environment hosting a controller virtual machine that provides high-performance storage access to user virtual machines through use of a memory caching subsystem, according to an embodiment.

The embodiment shown in FIG. 1B is merely one example. In particular, the reconfigurable cache subsystem $134_1$ can be implemented in any instances of user virtual machines (e.g., UVM $102_1$, UVM $102_2$, UVM $102_3$, . . . UVM $102_N$) or can be implemented in a controller virtual machine $110_1$, as shown. In some cases, the controller virtual machine $110_1$ is configured to perform various storage-related functions on behalf of a user virtual machine. For example, a controller virtual machine may abstract interactions between a user virtual machine and storage devices. Furthermore, a controller virtual machine may handle complex, and sometime multi-protocol interactions, to and from storage devices over a network. In some situations, and as shown, a storage access layer $118_1$ serves to federate I/O control 116 so as to abstract the lower layer (e.g., layer 0, layer 1, layer 2) aspects of the storage devices. In such a manner, many different storage device types and layout and connectivity, etc. can be addressed through the storage access layer $118_1$. Further, one or more instances of a controller virtual machine can maintain metadata 124 so as to retain configuration aspects and state of the storage devices.

The reconfigurable cache subsystem $134_1$ communicates with a memory manager 131 within the hypervisor 130 to request memory. As earlier indicated, dynamically-reconfigurable memory segments can be used as a cache tier. As shown, cache tiers 132 are implemented using segments within the dynamically-reconfigurable memory 112.

In a specific embodiment, a controller virtual machine can implement a cache for which cache tiers are implemented using memory retrieved from a hypervisor using balloon memory management techniques.

Figure 2:
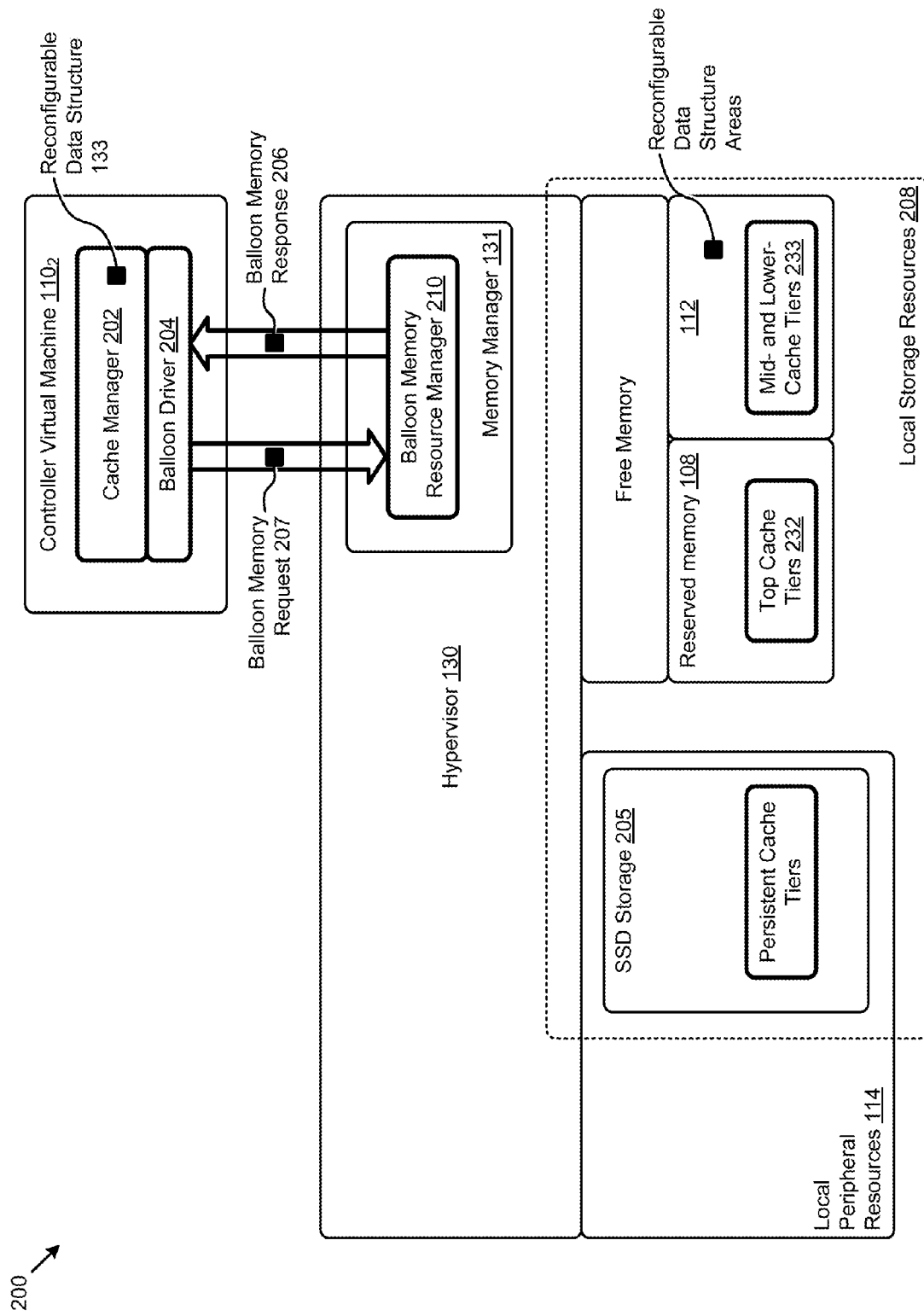
FIG. 2 depicts subsystem interactions between a controller virtual machine and a hypervisor through a balloon driver, according to some embodiments.

FIG. 2 depicts subsystem interactions 200 between a controller virtual machine $110_2$ and a hypervisor through a balloon driver. As an option, one or more variations of subsystem interactions 200 or any aspect thereof may be implemented in the context of the architecture and functionality of the embodiments described herein. Also, the subsystem interactions 200 or any aspect thereof may be implemented in any environment.

The embodiment shown in FIG. 2 depicts a particular configuration where a hypervisor hosts a balloon memory resource manager 210. The balloon memory resource manager can loan out segments within a memory space (e.g., perform a "deflate" operation), and/or can call in loaned out memory to replenish (e.g., perform an "inflate" operation). More particularly, a controller virtual machine can implement a cache manager 202, which uses a balloon driver 204, which in turn can send requests for balloon memory (see balloon memory request 207) and can receive responses (e.g., balloon memory response 206). The cache manager 202 can implement cache tiers using any regime or hierarchy of memory use. For example, some tiers (e.g., top cache tiers 232) can be implemented in allocated and reserved memory 108, and other tiers (e.g., mid- and lower-cache tiers 233) can be implemented in dynamically-reconfigurable memory 112. In some cases, and as shown, local storage resources include local memory segments as well as local peripheral resources such as SSDs (e.g., see local storage resources 208, and see SSD storage 205).

Figure 3A:
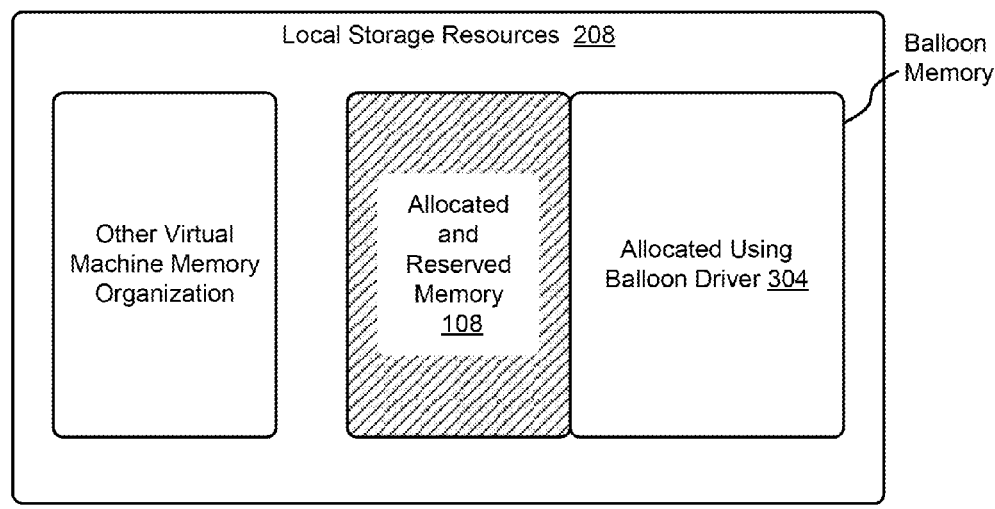
FIG. 3A and FIG. 3B depict balloon memory allocation techniques as used by virtual machines that implement ephemeral data structure reconfigurations, according to some embodiments.
Figure 3B:
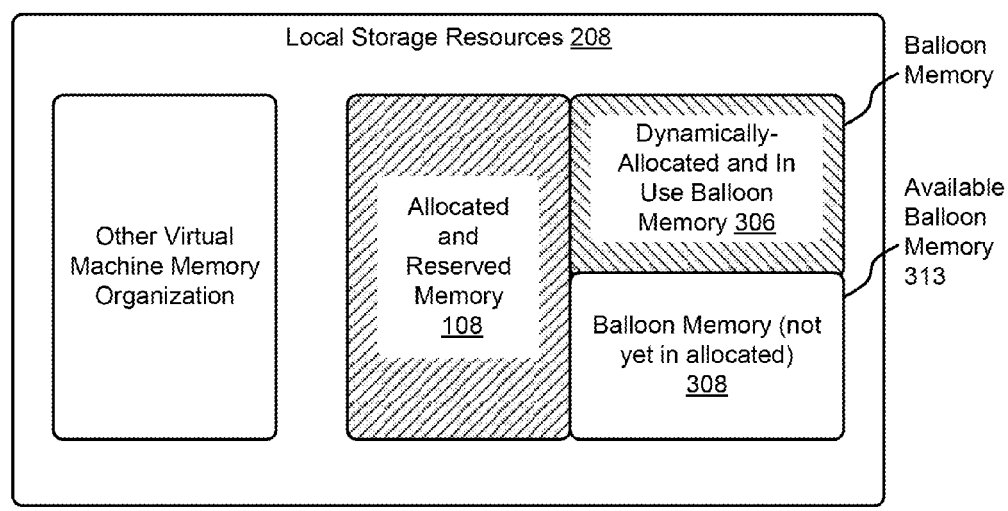

FIG. 3A and FIG. 3B depict balloon memory allocation techniques 3A00 and 3B00, respectively, as used by virtual machines that implement ephemeral data structure reconfigurations. As an option, one or more variations of balloon memory allocation technique 3A00 and/or balloon memory allocation technique 3B00 or any aspects thereof may be implemented in the context of the architecture and functionality of the embodiments described herein. Also, the balloon memory allocation techniques or any aspect thereof may be implemented in any environment.

The embodiment shown in FIG. 3A and FIG. 3B are merely examples. As shown, a memory allocation subsystem are can be logically constructed so as to use any portions of the aforementioned local storage resources. A balloon memory driver can be used to allocate portions of memory within the local storage resources. In particular, a balloon memory driver can be used to manage memory segments (e.g., see memory area 304) that are merely on loan to the requestor. In some cases, a requestor (e.g., a virtual machine) requests a memory segment (e.g., using a balloon memory driver call). Which memory segment is merely a portion of the total memory available to and managed by the balloon driver. As such, the total memory available to and managed by the balloon driver might be bifurcated into an in-use portion (e.g., see dynamically-allocated and in use balloon memory 306) and a not yet allocated portion (e.g., see balloon memory not yet allocated 308). Depending on the relative sizes of balloon memory requests with respect to the relative sizes of balloon memory returned to the balloon driver, the size of the available balloon memory 313 can expand or contract (e.g., "inflate" or "deflate"). The timing of the acts pertaining to balloon memory requests with respect to the acts of balloon memory being returned to the balloon driver can by asynchronous, and can be interleaved vis-à-vis one particular requestor (e.g., a first virtual machine) and another particular requestor (e.g., a second virtual machine).

Figure 4:
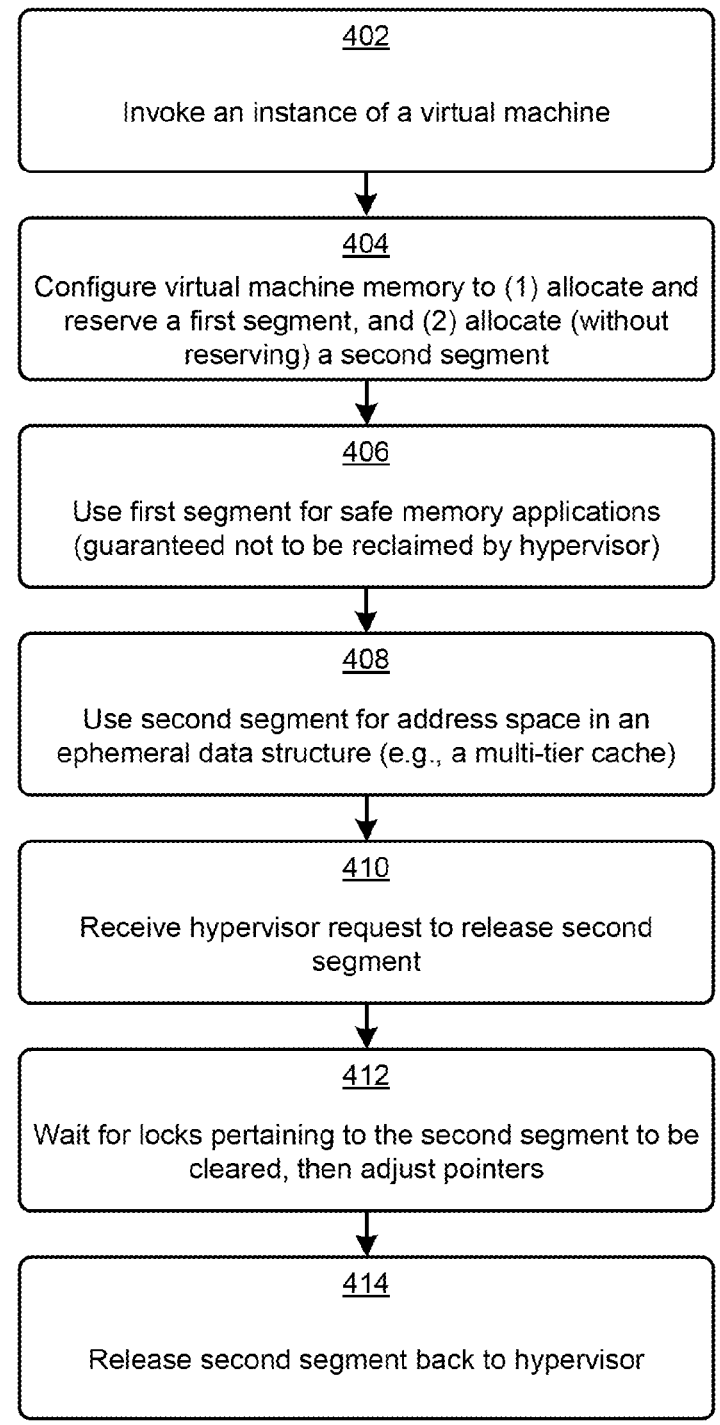
FIG. 4 depicts a balloon memory allocation request and release flow as used by virtual machines that implement ephemeral data structure reconfiguration, according to some embodiments.

FIG. 4 depicts a balloon memory allocation request and release flow 400 as used by virtual machines that implement ephemeral data structure reconfiguration. As an option, one or more variations of memory ballooning request and release flow 400 or any aspect thereof may be implemented in the context of the architecture and functionality of the embodiments described herein. Also, the memory ballooning request and release flow 400 or any aspect thereof may be implemented in any environment.

Spontaneous data structure reconfigurations can be performed over a cache subsystem. A flow depicting one such use commences upon invocation of an instance of a virtual machine (see step 402). The virtual machine configures a cache memory by allocating a first segment of memory that is allocated and reserved (e.g., allocated and reserved memory 108), and the controller virtual machine further configures the cache memory by allocating a second segment of memory that is a segment within the dynamically-reconfigurable memory 112 (see step 404). The hypervisor will not ask for the return of such allocated and reserved memory, so the cache can implement pointers, lists, metadata and other non-content storage using the first segment of memory (see step 406). The second segments can be used to implement at least some address space in ephemeral data structures (see step 408). The lists, metadata and other non-content storage using the first segment of memory can include pointers to the second segments. At any time and, in particular, upon a hypervisor request to release previously negotiated memory (see step 410) any one or more second segments can be processed so as to unlink or otherwise de-reference uses of the second segments (see step 412). Once any locks (e.g., see FIG. 6) on the second segments are cleared, the cache manager 202 will thenceforth not use the second segments. The second segments can be returned to the hypervisor (see step 414), even without initiating or completing a copy operation of the contents of the second segment.

Figure 5:
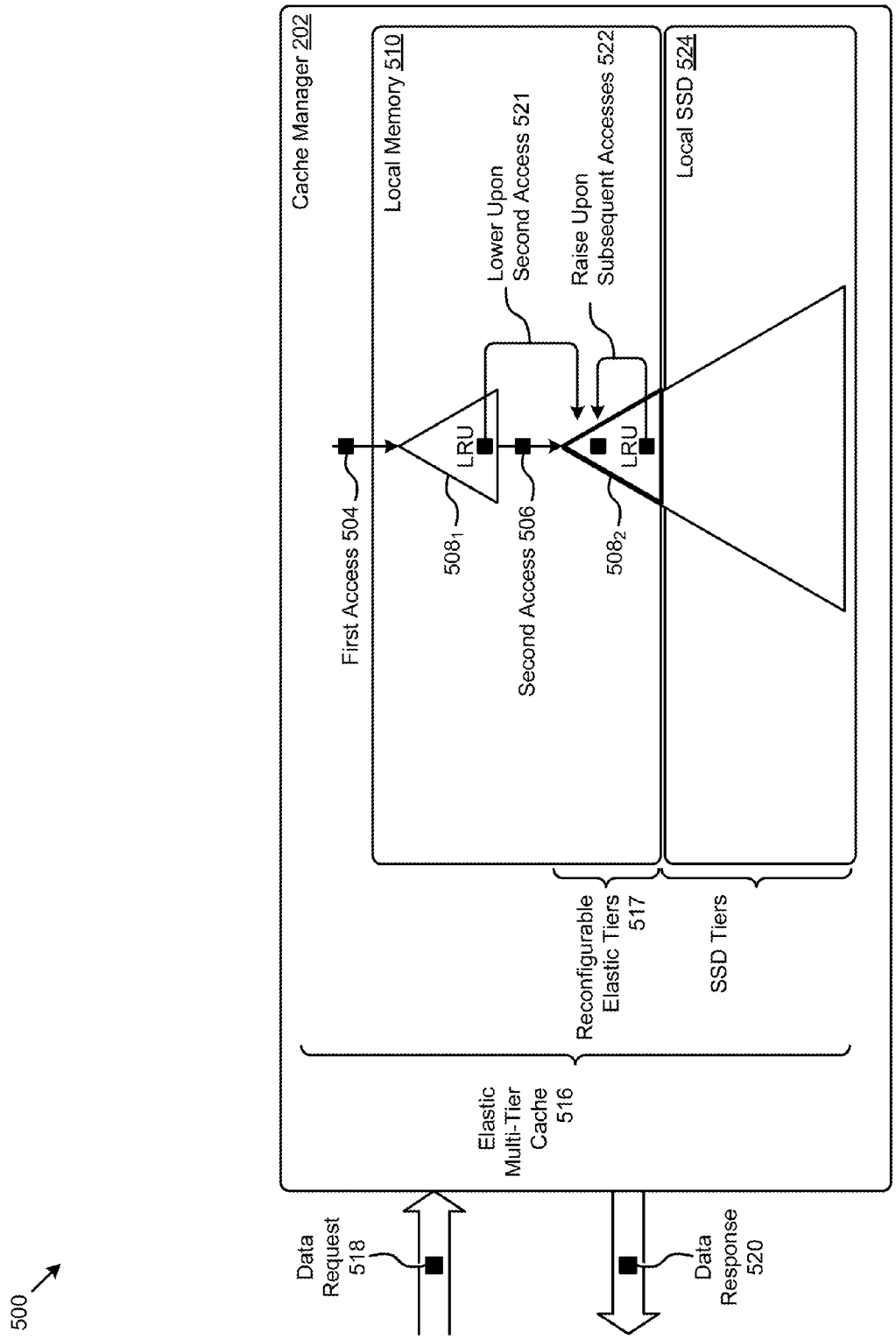
FIG. 5 depicts a multi-tier cache subsystem that implements spontaneous caching subsystem reconfiguration, according to an embodiment.

FIG. 5 depicts a multi-tier cache subsystem 500 that implements spontaneous caching subsystem reconfiguration. As an option, one or more variations of multi-tier cache subsystem 500 or any aspect thereof may be implemented in the context of the architecture and functionality of the embodiments described herein. Also, the multi-tier cache subsystem 500 or any aspect thereof may be implemented in any environment.

The embodiment shown in FIG. 5 implements an elastic multi-tier cache 516 under control of a cache manager 202. The elastic multi-tier cache includes reconfigurable elastic tiers 517 (e.g., a portion of which is formed using local memory 510 and/or dynamically-reconfigurable memory 112) as well as SSD tiers that are formed of solid state storage (e.g., local SSD 524).

A least recently used (LRU) algorithm is applied for a first LRU segment $508_1$, and a similar (though not necessarily identical) LRU algorithm is applied for a second LRU segment $508_2$. Entries are stored in the first LRU segment upon first access (e.g., from a first access 504 stemming from a data request 518), and are moved to the second LRU segment upon a second or Nth access. This serves to avoid the unintended consequence where a large amount of data is accessed once (e.g., by reading a file into memory), which could cause eviction of other data in the cache that might be repeatedly accessed. Accordingly, entries in the first LRU segment are moved to the second LRU segment upon a second access 506 (e.g., see operation to lower upon second access 521). In addition to performing the LRU algorithm over the second segment, subsequent accesses to an entry serve to promote the entry (e.g., see operation to raise upon subsequent access 522), which entry or contents therefrom can in turn be provided to a caller via a data response 520.

Figure 6:
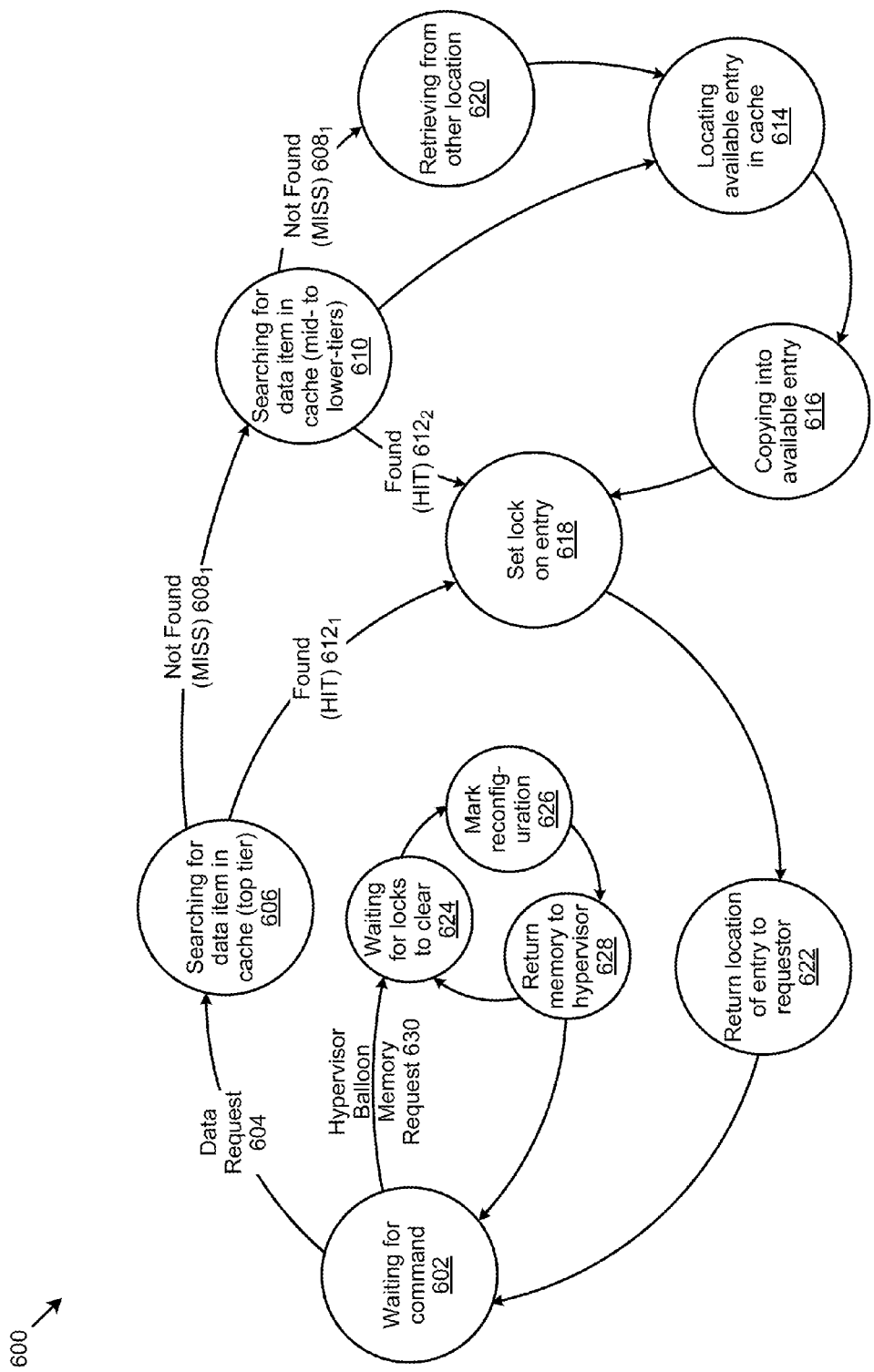
FIG. 6 is a sequence chart depicting a hit-release-miss sequence in systems that implement spontaneous reconfiguration of a caching subsystem, according to some embodiments.

FIG. 6 is a sequence chart depicting a hit-release-miss sequence 600 in systems that implement spontaneous reconfiguration of a caching subsystem. As an option, one or more variations of hit-release-miss sequence 600 or any aspect thereof may be implemented in the context of the architecture and functionality of the embodiments described herein. Also, the hit-release-miss sequence 600 or any aspect thereof may be implemented in any environment.

A waiting state shown as state 602 is entered after a data seeker (e.g., a virtual machine) identifies data to be retrieved (e.g., see data request transition 604), and the cache manager determines if the sought-for data is present in the cache (e.g., top-tier of the cache). If the sought-for data is present in the cache, then the caching subsystem searches for the requested data item (see state 606). In the case of a cache hit (e.g., see transition $612_1$), lock is set on the corresponding data item entry (see state 618) and the location of the entry is returned to the requestor (see state 622). The cache subsystem again enters a wait state (see state 602) awaiting another cache subsystem command.

Upon receiving another cache subsystem command the state shown as state 602 is entered after a data seeker (e.g., a virtual machine) identifies data to be retrieved (e.g., see data request 604), and the cache manager determines if the sought-for data is present in the top tier of the cache. If the sought-for data is not present in the top-tier of the cache, then the caching subsystem searches for the requested data item (see state 610) in lower tiers of the cache. In the case of a cache hit (e.g., see transition $612_2$), lock is set on the corresponding data item entry. In the case of a cache miss (see transition $608_1$, the cache subsystem retrieves from another location (e.g., see state 620). Upon retrieving the requested data, an available entry in the cache is located (e.g., see state 614), and when available, the retrieved data item is coped to the memory space of the available entry (see state 616). A lock is set, and the location of the entry as well as the location of the lock is sent to the requestor (see state 622).

At some moment in time, the hypervisor might request a return of the loaned out memory that was used to implement the cache. Such a hypervisor command can be processed by the cache subsystem, and transition 630 is taken. The aforementioned request for return of memory might pertain to a single segment or to multiple segments, and in any segment there might be one or more locks on entries. Accordingly, the cache subsystem waits for locks to clear (see state 624) and the segment or segments now having all locks cleared (due to the state 624) the cache can be reconfigured so as to no longer use the balloon segments (see mark reconfiguration state 626), at which moment the balloon memory requested by the hypervisor can be returned (see state 628).

The cache reconfiguration can be implemented using a variety of data structures and/or regimes. One such regime involving managing two cache tiers areas is shown and discussed as pertains to FIG. 7.

Figure 7:
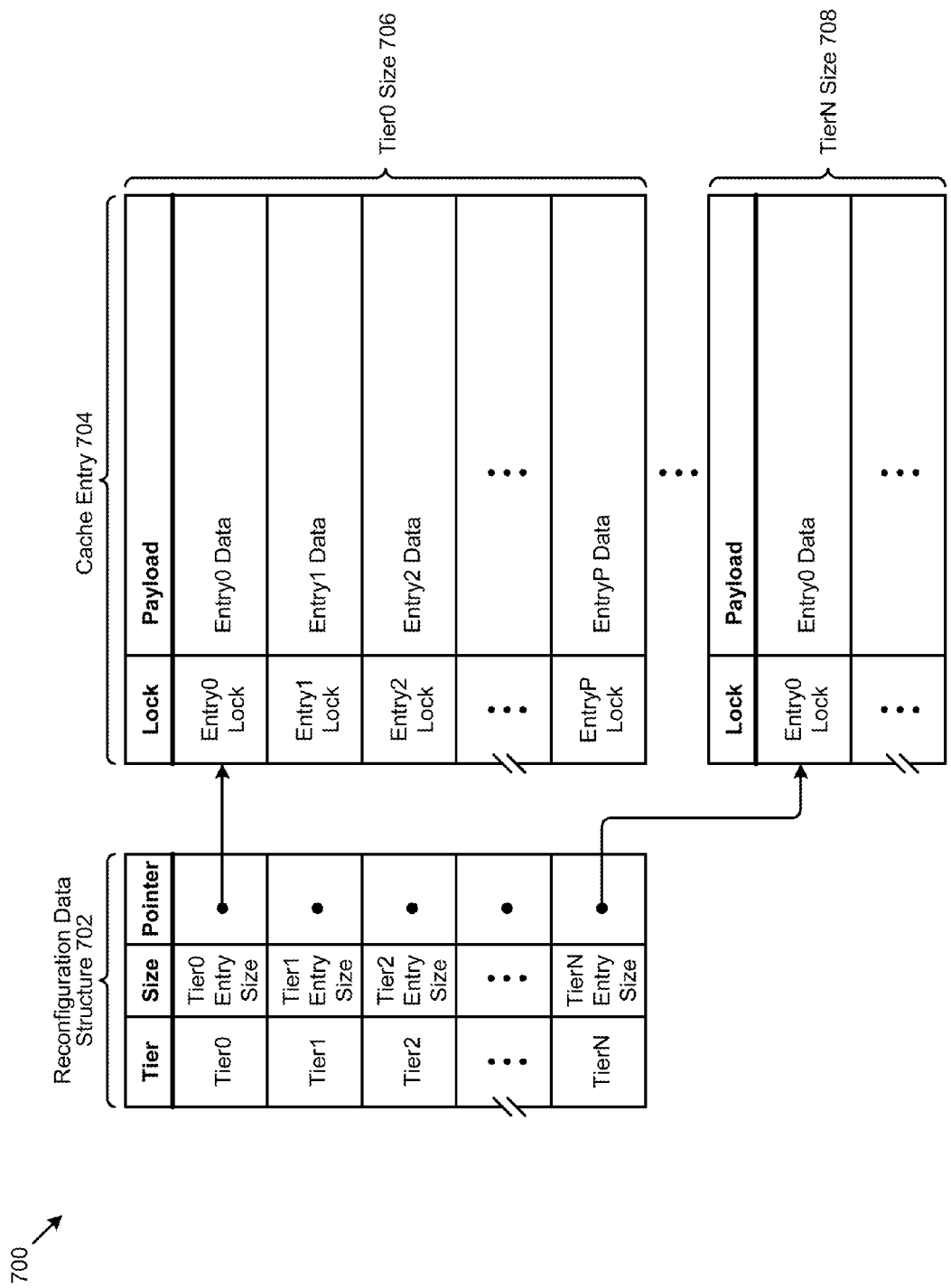
FIG. 7 depicts a data structure used to implement spontaneous reconfiguration of a caching subsystem using balloon memory allocation, according to some embodiments.

FIG. 7 depicts a data structure 700 used to implement spontaneous reconfiguration of a caching subsystem using balloon memory allocation. As an option, one or more variations of data structure 700 or any aspect thereof may be implemented in the context of the architecture and functionality of the embodiments described herein. Also, the data structure 700 or any aspect thereof may be implemented in any environment.

The data structure 700 comprises two types of functional areas: (1) a reconfiguration data structure 702, and (2) a set of cache tiers, shown as cache tier0, through cache tierN (e.g., see cache tier0 of tier0 size 706 and cache tierN of tierN size 708). The reconfiguration data structure 702 includes substructures comprising a tier indication (e.g., see tier0, tier1, tier2, through tierN), an entry size indication (e.g., see tier0 entry size, tier1 entry size, tier2 entry size, . . . , tierN entry size), and a pointer to the beginning of the respective tier. In this particular fixed-size cache entry implementation, the beginning address of a second or nth entry in a particular tier can be determined from the pointer plus an integer multiple of the entry size indication.

Also shown in the shown embodiment are entry lock values that correspond to individual entries comprising payload (e.g., data items retrieved and placed in the cache). The embodiment of FIG. 7 depicts just one possibility for data structures that can felicitously implement fast reconfiguration of a content caching subsystem. Various scenarios for fast reconfiguration are shown and discussed as pertains to the following figures.

Figure 8A:
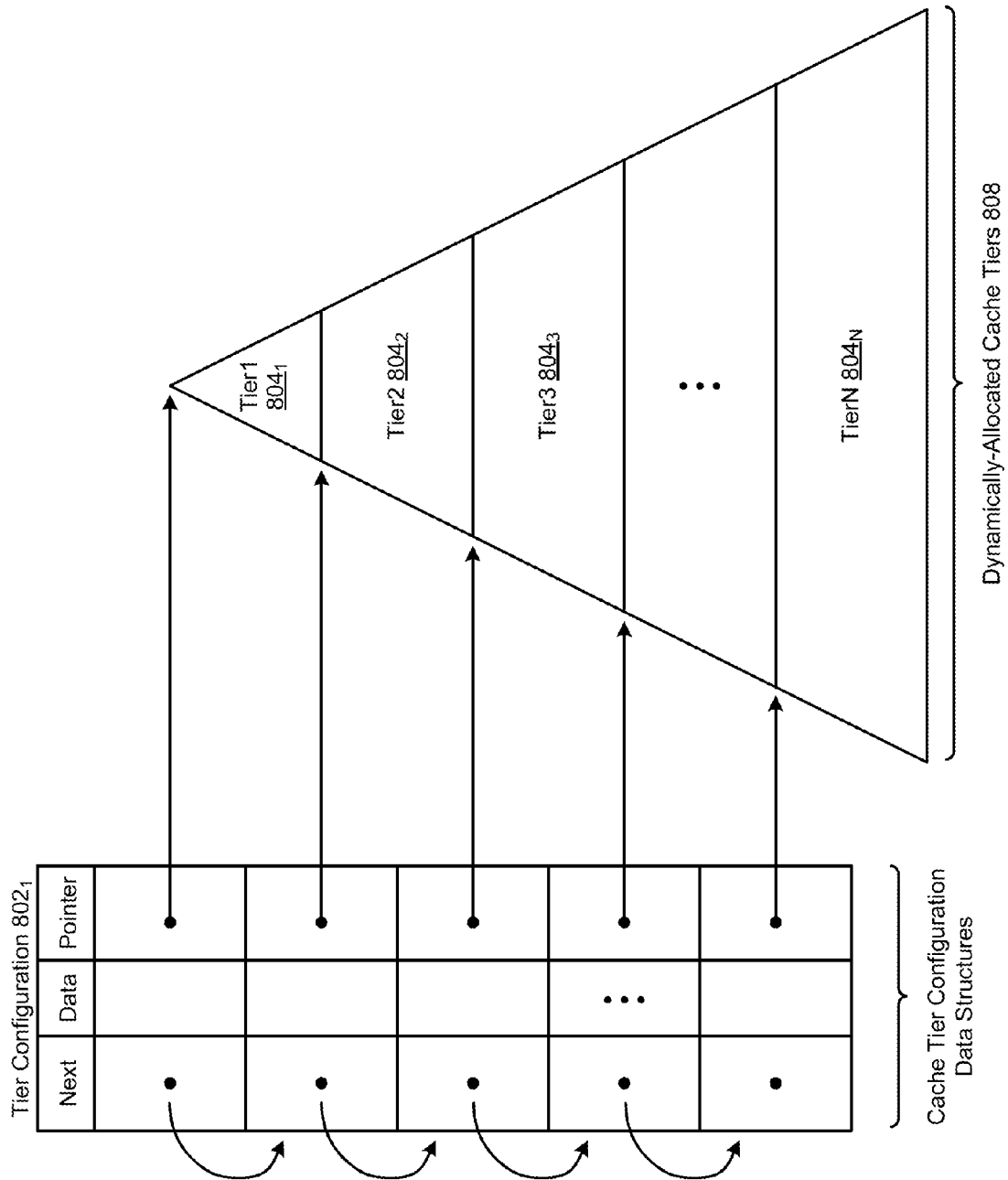
FIG. 8A, FIG. 8B, and FIG. 8C depict reconfiguration sequences using data structures to implement aspects of spontaneous reconfiguration of a caching subsystem using balloon memory allocation.
Figure 8B:
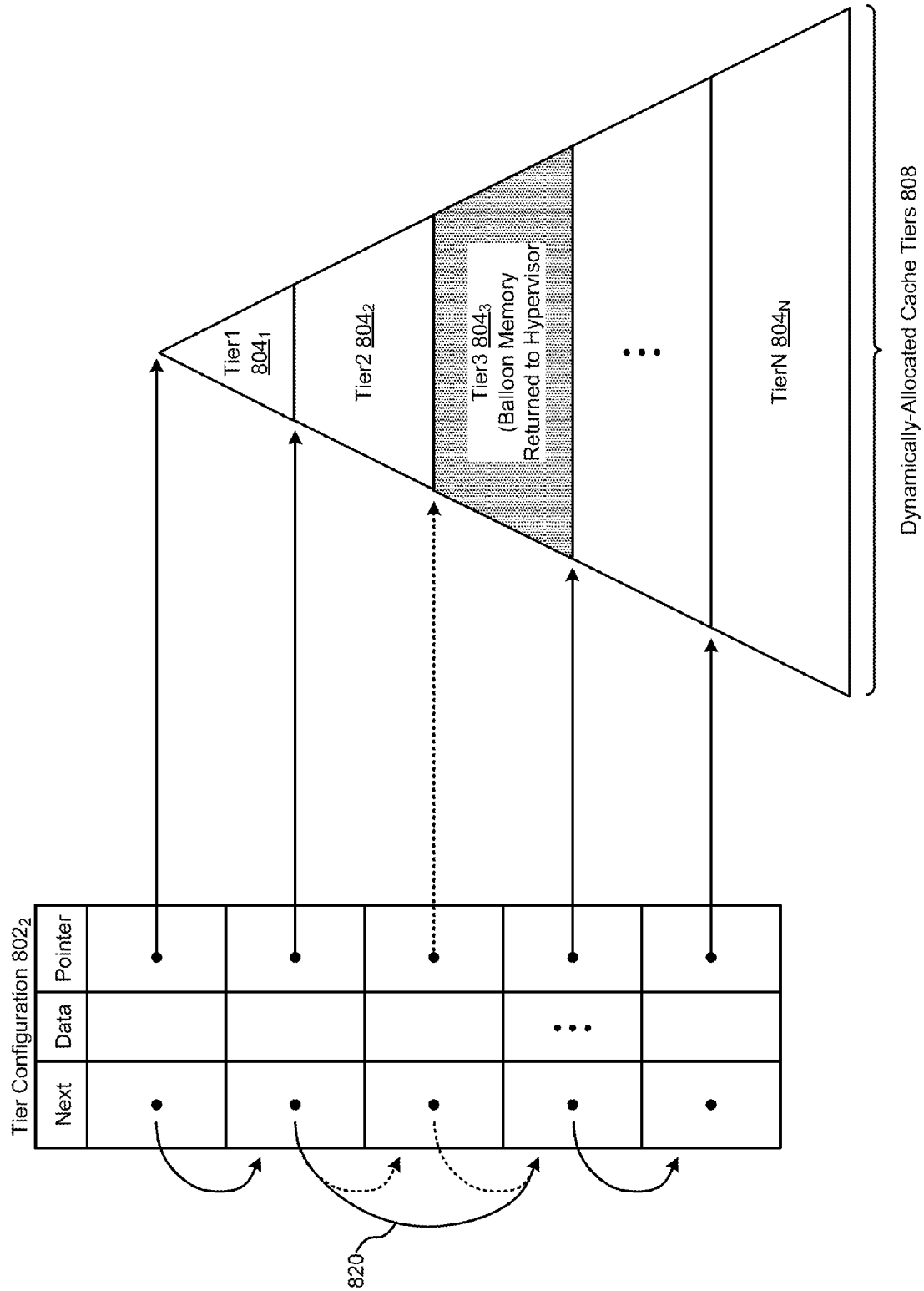
Figure 8C:
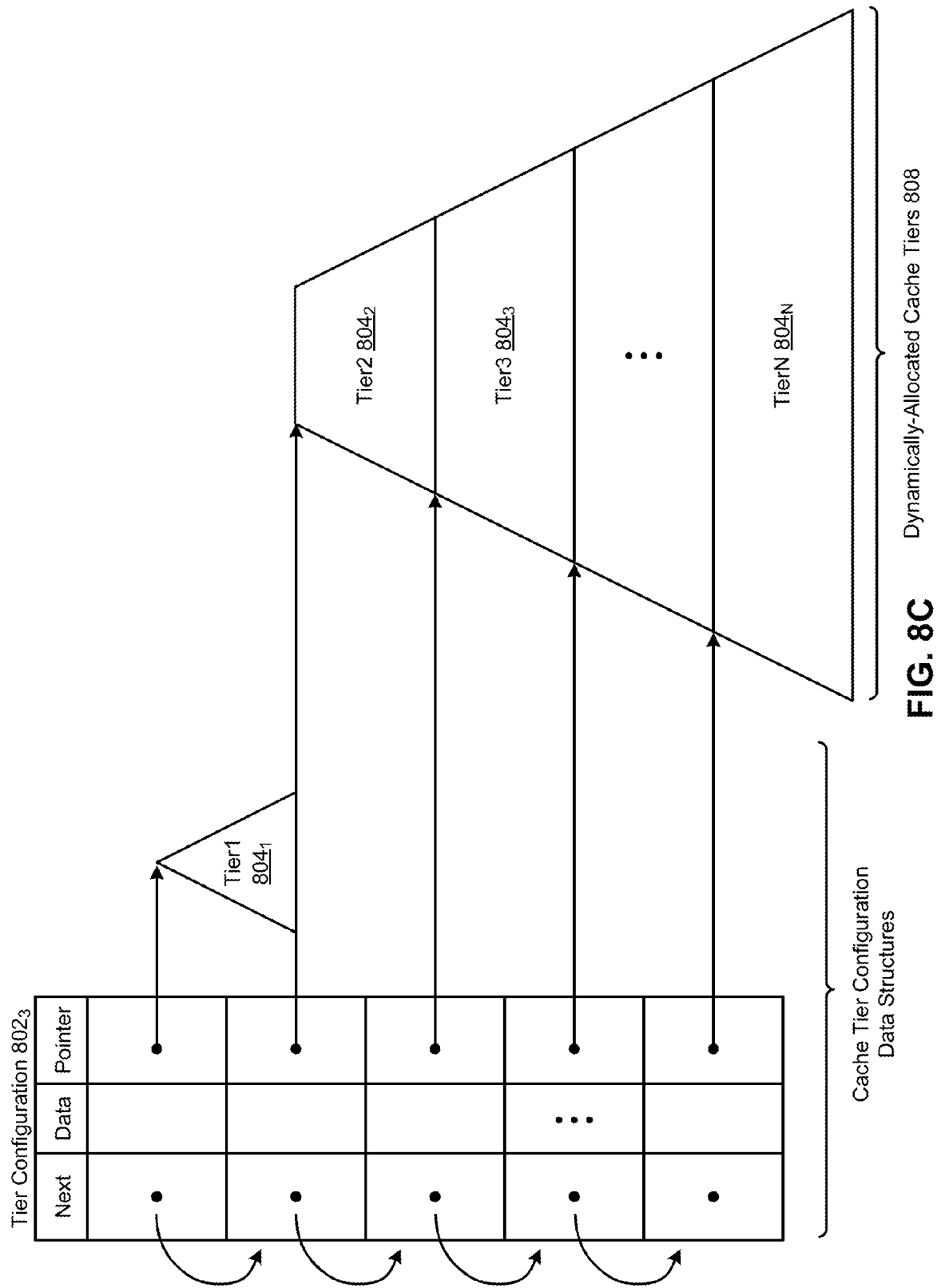

FIG. 8A, FIG. 8B and FIG. 8C depict reconfiguration sequences using data structures to implement aspects of spontaneous reconfiguration of a caching subsystem using balloon memory allocation. As an option, one or more variations of the data structures or any aspect thereof may be implemented in the context of the architecture and functionality of the embodiments described herein. Also, the data structures or any aspect thereof may be implemented in any environment.

The embodiment of FIG. 8A depicts a tier configuration $802_1$ that includes a list of tiers (e.g., see column "Next"). As shown, the list is a linked list of entries, where each entry points to a tier (e.g., tier1 $804_1$, tier2 $804_2$, tier3 $804_3$, tierN $804_N$). The data structure can also include other data pertaining to the tiers and/or to the data structure itself.

The tier configuration $802_2$ depicts an organization of data structures that can be rapidly reconfigured. In particular a tier pointer (refer to FIG. 7) can be implemented as a pointer to the beginning address of a "next" tier. An entire tier can be removed from the cache merely by changing one pointer address. When a multi-tier cache is implemented using balloon memory tiers, then the tier can be returned to the hypervisor within one context switch time duration. More particularly, the shown cache tiers are composed of dynamically-allocated balloon memory to form a set of dynamically-allocated cache tiers 808 such that at any moment in time, the hypervisor may request a return of the balloon memory, and the dynamically-allocated cache tiers 808 as well as the data structure referring to the dynamically-allocated cache tiers 808 can be reconfigured with very low latency (e.g., requiring a small number of instructions). Specifically, the data structure can be minimally adjusted to reconfigure the tiers to reflect the absence of the returned balloon memory. One such reconfiguration is depicted in FIG. 8B.

FIG. 8B depicts reconfiguration upon returning a balloon memory tier to the hypervisor. More particularly the tier configuration $802_2$ depicts changes made to the data structure to as to reflect the return of tier3 $804_3$ to the hypervisor. Specifically, the tier3 entry in the data structure that formerly (e.g., refer to FIG. 8A) pointed to the soon-to-be-released tier3 becomes unused. Any pointers in the data structure that point to the soon-to-be-released tier3 become obsolete. In the specific case shown, the new "Next" pointer for tier2 (e.g., new pointer 820) now points to the first tier beyond the soon-to-be-released tier3. Also, and as shown, any pointers or other data items that pertain to the soon-to-be-released tier3 become obsolete.

As earlier indicated, a segment that had been allocated from balloon memory can be returned to the hypervisor almost immediately upon request. In some embodiments, a memory segment that had been allocated from balloon memory is used to hold cache entries, and, in some cases cache entries comprise a lock field. The lock field is set by the cache manager when an entry is made accessible to a data item requestor. The data item requestor can release the lock when finished accessing the data item that is stored in the cache entry 704.

In some circumstances, the total size of the balloon memory segment to be released back to the hypervisor is sufficiently small, or is sufficiently sparsely populated such the contents (e.g., cache entries) of the balloon memory segment to be released back to the hypervisor can be copied to another cache tier, possibly a cache tier in the local SSD (e.g., SSD tiers of FIG. 5).

FIG. 8C depicts an alternative configuration of cache. More particularly, the tier configuration $802_3$ depicts the highest tier (e.g., tier1 $804_1$) is a being allocated (and reserved) out of reserved memory. This embodiments implements a cache that has at least one tier that is guaranteed to persist, even of the lower tiers are reconfigured or eliminated in response to a hypervisor request for return of balloon memory.

ADDITIONAL EMBODIMENTS OF THE DISCLOSURE

Additional Practical Application Examples

Figure 9A:
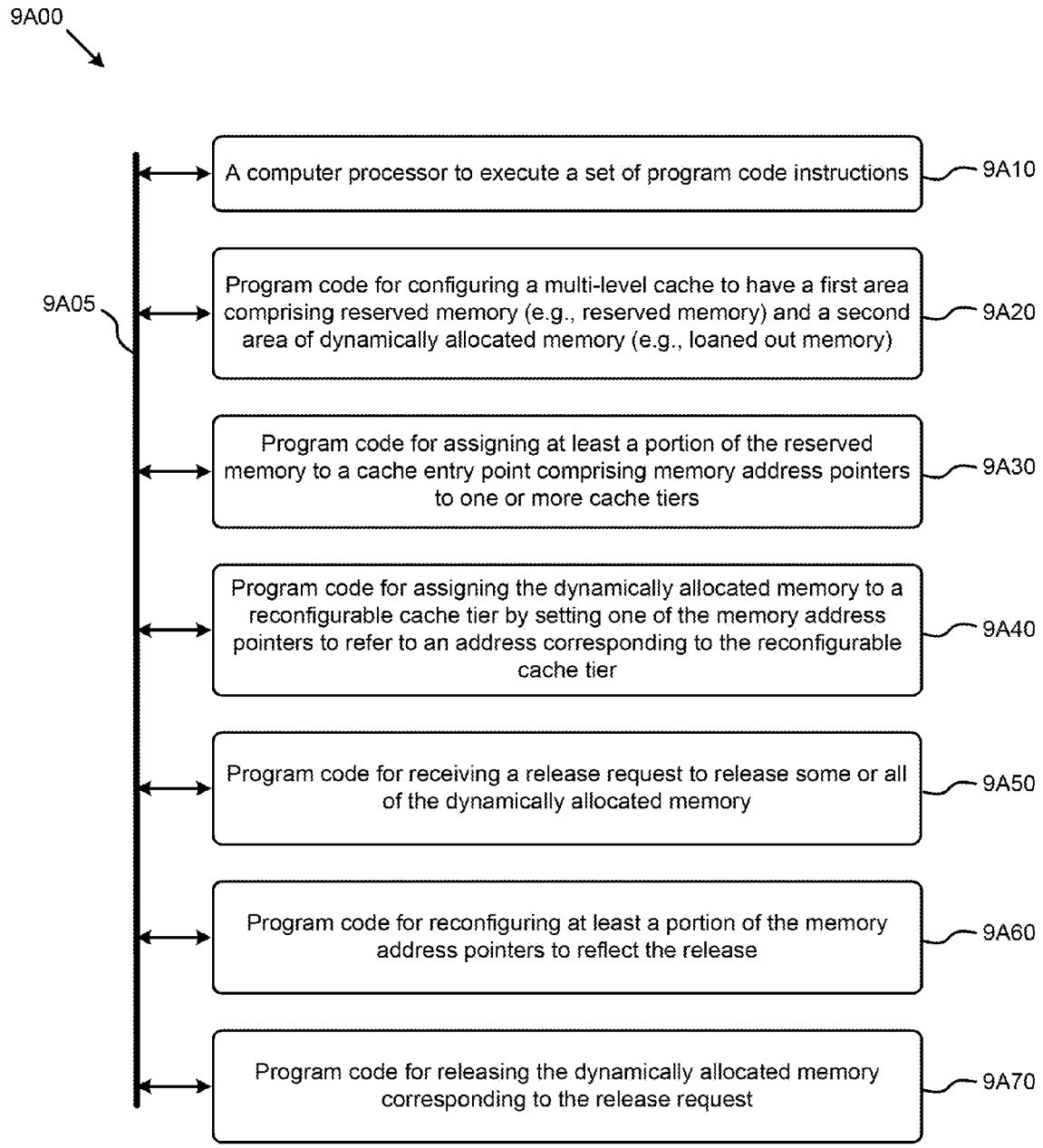
FIG. 9A depicts a system component as an arrangement of computing modules that are interconnected so as to operate cooperatively to implement certain of the herein-disclosed embodiments.

FIG. 9A depicts a system component 9A00 as an arrangement of computing modules that are interconnected so as to operate cooperatively to implement certain of the herein-disclosed embodiments. The partitioning of system component is merely illustrative and other partitions are possible. FIG. 9A depicts a block diagram of a system to perform certain functions of a computer system. As an option, the present system may be implemented in the context of the architecture and functionality of the embodiments described herein. Of course, however, the system or any operation therein may be carried out in any desired environment. The system comprises at least one processor and at least one memory, the memory serving to store program instructions corresponding to the operations of the system. As shown, an operation can be implemented in whole or in part using program instructions accessible by a module. The modules are connected to a communication path 9A05, and any operation can communicate with other operations over communication path 9A05. The modules of the system can, individually or in combination, perform method operations within system. Any operations performed within system may be performed in any order unless as may be specified in the claims. The shown embodiment implements a portion of a computer system, presented as system, comprising a computer processor to execute a set of program code instructions (see module 9A10) and modules for accessing memory to hold program code instructions to perform: configuring a multi-level cache to have a first area comprising reserved memory and having a second area of dynamically allocated memory (see module 9A20); assigning at least a portion of the reserved memory to a cache entry point comprising memory address pointers to one or more cache tiers (see module 9A30); assigning the dynamically allocated memory to a reconfigurable cache tier by setting one of the memory address pointers to refer to an address corresponding to the reconfigurable cache tier (see module 9A40); receiving a release request to release some or all of the dynamically allocated memory (see module 9A50); reconfiguring at least a portion of the memory address pointers to reflect the release (see module 9A60); and releasing the dynamically allocated memory corresponding to the release request (see module 9A70).

Figure 9B:
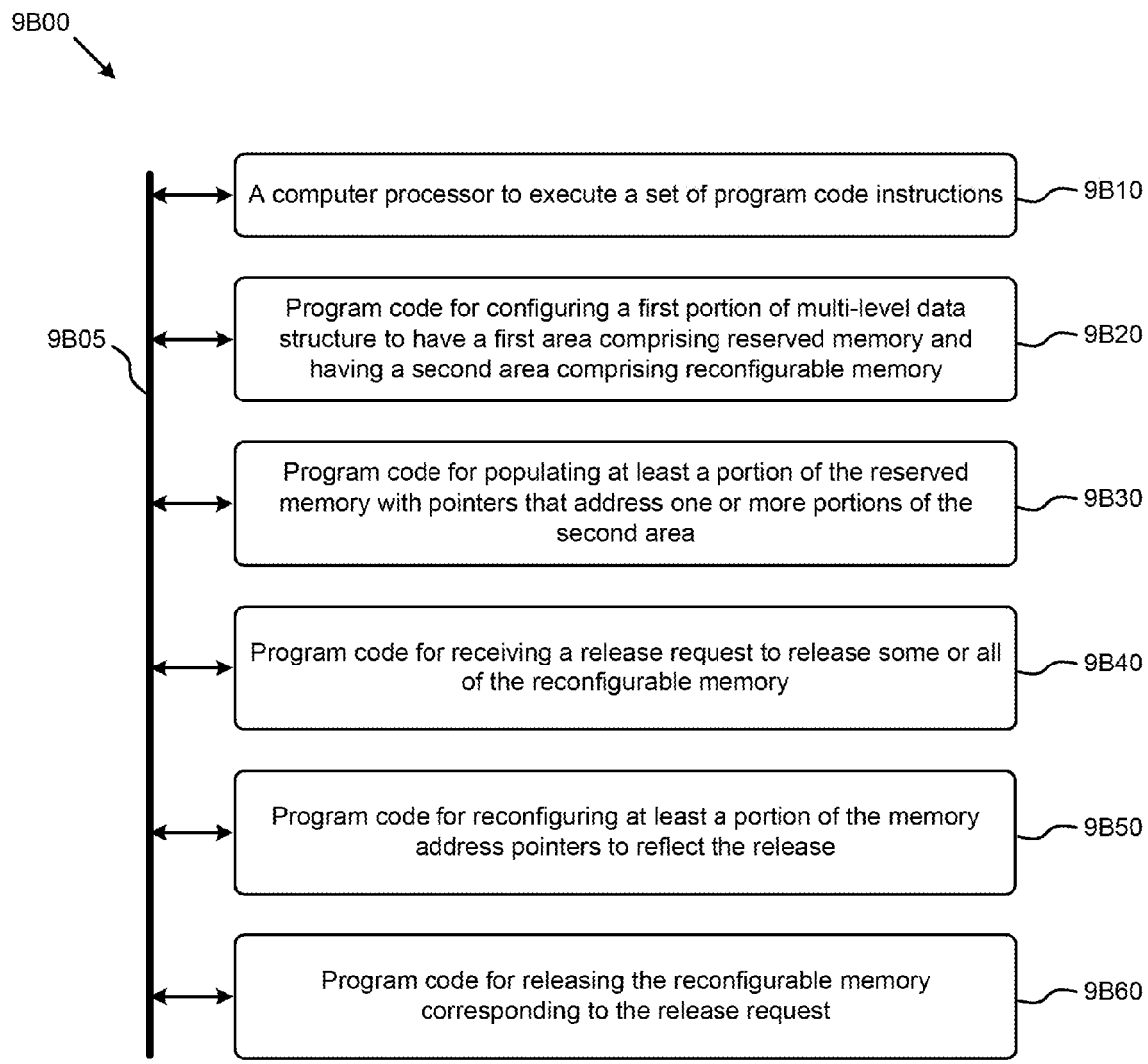
FIG. 9B depicts a system component as an arrangement of computing modules that are interconnected so as to operate cooperatively to implement certain of the herein-disclosed embodiments.

FIG. 9B depicts a system component 9B00 as an arrangement of computing modules that are interconnected so as to operate cooperatively to implement certain of the herein-disclosed embodiments. The partitioning of system component is merely illustrative and other partitions are possible. As an option, the present system may be implemented in the context of the architecture and functionality of the embodiments described herein. Of course, however, the system or any operation therein may be carried out in any desired environment. The system comprises at least one processor and at least one memory, the memory serving to store program instructions corresponding to the operations of the system. As shown, an operation can be implemented in whole or in part using program instructions accessible by a module. The modules are connected to a communication path 9B05, and any operation can communicate with other operations over communication path 9B05. The modules of the system can, individually or in combination, perform method operations within system. Any operations performed within system may be performed in any order unless as may be specified in the claims. The shown embodiment implements a portion of a computer system, presented as system, comprising a computer processor to execute a set of program code instructions (see module 9B10) and modules for accessing memory to hold program code instructions to perform: configuring a first portion of multi-level data structure to have a first area comprising reserved memory and having a second area comprising reconfigurable memory (see module 9B20); populating at least a portion of the reserved memory with pointers that address one or more portions of the second area (see module 9B30); receiving a release request to release some or all of the reconfigurable memory (see module 9B40); reconfiguring at least a portion of the memory address pointers to reflect the release (see module 9B50); and releasing the reconfigurable memory corresponding to the release request (see module 9B60).

System Architecture Overview

Additional System Architecture Examples

Figure 10A:
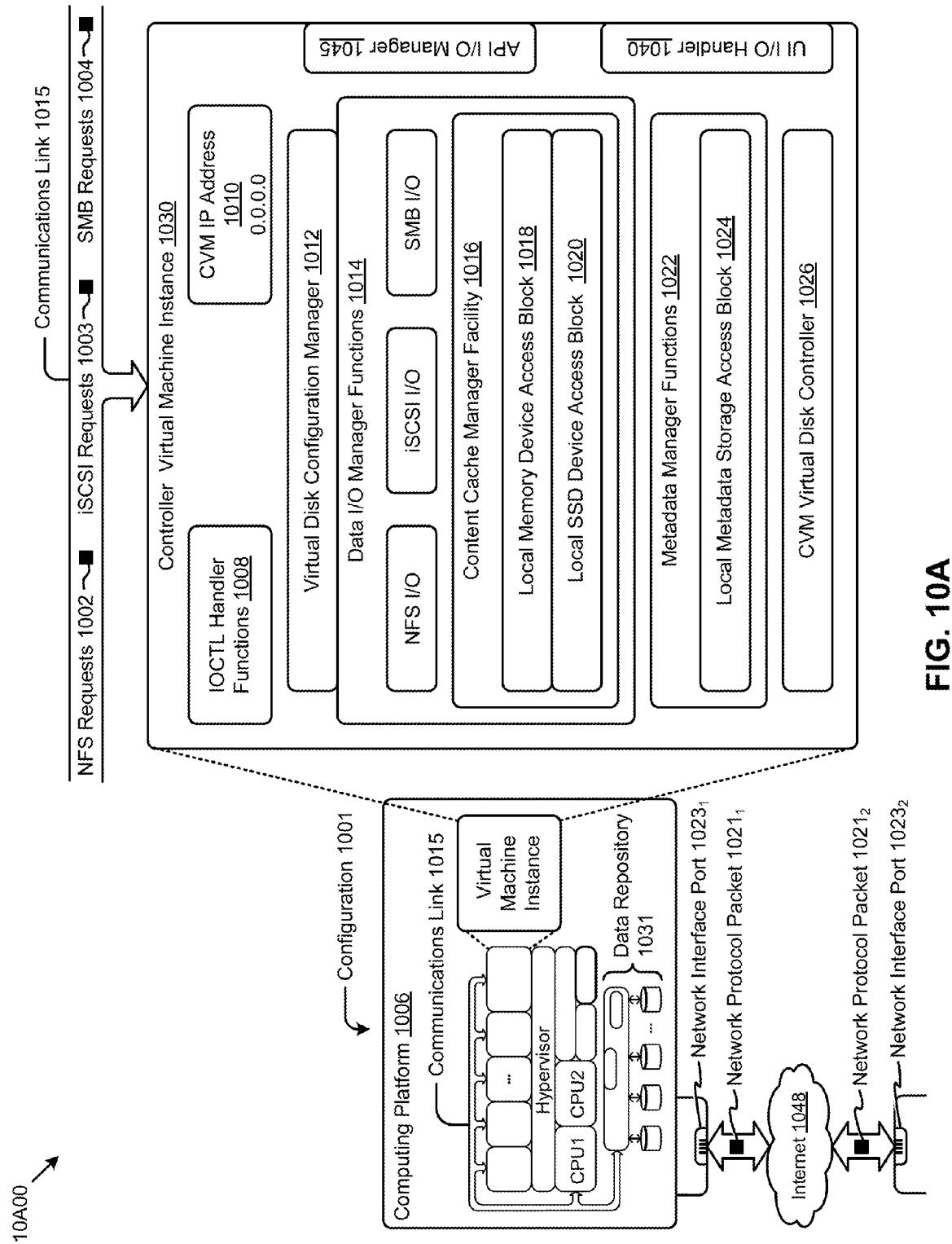
FIG. 10A and FIG. 10B depicts a controller virtual machine architecture, according to an embodiment.

FIG. 10A depicts a virtual machine architecture 10A00 comprising a collection of interconnected components suitable for implementing embodiments of the present disclosure and/or for use in the herein-described environments. The shown virtual machine architecture 10A00 includes a virtual machine instance in a configuration 1001 that is further described as pertaining to the controller virtual machine instance 1030. A controller virtual machine instance receives block I/O (input/output or IO) storage requests as network file system (NFS) requests in the form of NFS requests 1002, and/or internet small computer storage interface (iSCSI) block IO requests in the form of iSCSI requests 1003, and/or Samba file system requests (SMB) in the form of SMB requests 1004. The controller virtual machine instance publishes and responds to an internet protocol (IP) address (e.g., see CVM IP address 1010. Various forms of input and output (I/O or IO) can be handled by one or more IO control handler functions (see IOCTL functions 1008) that interface to other functions such as data IO manager functions 1014, and/or metadata manager functions 1022. As shown, the data IO manager functions can include communication with a virtual disk configuration manager 1012, and/or can include direct or indirect communication with any of various block IO functions (e.g., NFS IO, iSCSI IO, SMB IO, etc.).

In addition to block IO functions, the configuration 1001 supports IO of any form (e.g., block IO, streaming IO, packet-based IO, HTTP traffic, etc.) through either or both of a user interface (UI) handler such as UI IO handler 1040 and/or through any of a range of application programming interfaces (APIs), possibly through the shown API IO manager 1045.

The communications link 1015 can be configured to transmit (e.g., send, receive, signal, etc.) any types of communications packets comprising any organization of data items. The data items can comprise a payload data area as well as a destination address (e.g., a destination IP address), a source address (e.g., a source IP address), and can include various packet processing techniques (e.g., tunneling), encodings (e.g., encryption), and/or formatting of bit fields into fixed-length blocks or into variable length fields used to populate the payload. In some cases, packet characteristics include a version identifier, a packet or payload length, a traffic class, a flow label, etc. In some cases the payload comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions a data processor for execution. Such a medium may take many forms including, but not limited to, non-volatile media and volatile media. Non-volatile media includes, for example, solid state storage devices (SSD), or optical or magnetic disks such as disk drives or tape drives. Volatile media includes dynamic memory such as a random access memory. As shown, the controller virtual machine instance 1030 includes a content cache manager facility 1016 that accesses storage locations, possibly including local DRAM (e.g., through the local memory device access block 1018) and/or possibly including accesses to local solid state storage (e.g., through local SSD device access block 1020).

Common forms of computer readable media includes any non-transitory computer readable medium, for example, floppy disk, flexible disk, hard disk, magnetic tape, or any other magnetic medium; CD-ROM or any other optical medium; punch cards, paper tape, or any other physical medium with patterns of holes, or any RAM, PROM, EPROM, FLASH-EPROM, or any other memory chip or cartridge. Any data can be stored, for example, in any form of external data repository 1031, which in turn can be formatted into any one or more storage areas, and which can comprise parameterized storage accessible by a key (e.g., a filename, a table name, a block address, an offset address, etc.). An external data repository 1031, can store any forms of data, and may comprise a storage area dedicated to storage of metadata pertaining to the stored forms of data. In some cases, metadata, can be divided into portions. Such portions and/or cache copies can be stored in the external storage data repository and/or in a local storage area (e.g., in local DRAM areas and/or in local SSD areas). Such local storage can be accessed using functions provided by a local metadata storage access block 1024. The external data repository 1031, can be configured using a CVM virtual disk controller 1026, which can in turn manage any number or any configuration of virtual disks.

Execution of the sequences of instructions to practice certain embodiments of the disclosure are performed by a one or more instances of a processing element such as a data processor, or such as a central processing unit (e.g., CPU1, CPU2). According to certain embodiments of the disclosure, two or more instances of configuration 1001 can be coupled by a communications link 1015 (e.g., backplane, LAN, PTSN, wired or wireless network, etc.) and each instance may perform respective portions of sequences of instructions as may be required to practice embodiments of the disclosure The shown computing platform 1006 is interconnected to the Internet 1048 through one or more network interface ports (e.g., network interface port $1023_1$ and network interface port $1023_2$). The configuration 1001 can be addressed through one or more network interface ports using an IP address. Any operational element within computing platform 1006 can perform sending and receiving operations using any of a range of network protocols, possibly including network protocols that send and receive packets (e.g., see network protocol packet $1021_1$ and network protocol packet $1021_2$).

The computing platform 1006 may transmit and receive messages that can be composed of configuration data, and/or any other forms of data and/or instructions organized into a data structure (e.g., communications packets). In some cases, the data structure includes program code instructions (e.g., application code), communicated through Internet 1048 and/or through any one or more instances of communications link 1015. Received program code may be processed and/or executed by a CPU as it is received and/or program code may be stored in any volatile or non-volatile storage for later execution. Program code can be transmitted via an upload (e.g., an upload from an access device over the Internet 1048 to computing platform 1006). Further, program code and/or results of executing program code can be delivered to a particular user via a download (e.g., a download from the computing platform 1006 over the Internet 1048 to an access device).

The configuration 1001 is merely one sample configuration. Other configurations or partitions can include further data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor. Some embodiments include one or more special-purpose hardware components (e.g., power control, logic, sensors, transducers, etc.). A module may include one or more state machines and/or combinational logic used to implement or facilitate the operational and/or performance characteristics the embodiments.

Various implementations of the data repository comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of spontaneous reconfiguration of data structures using balloon memory allocation. Such files or records can be brought into and/or stored in volatile or non-volatile memory.

Figure 10B:
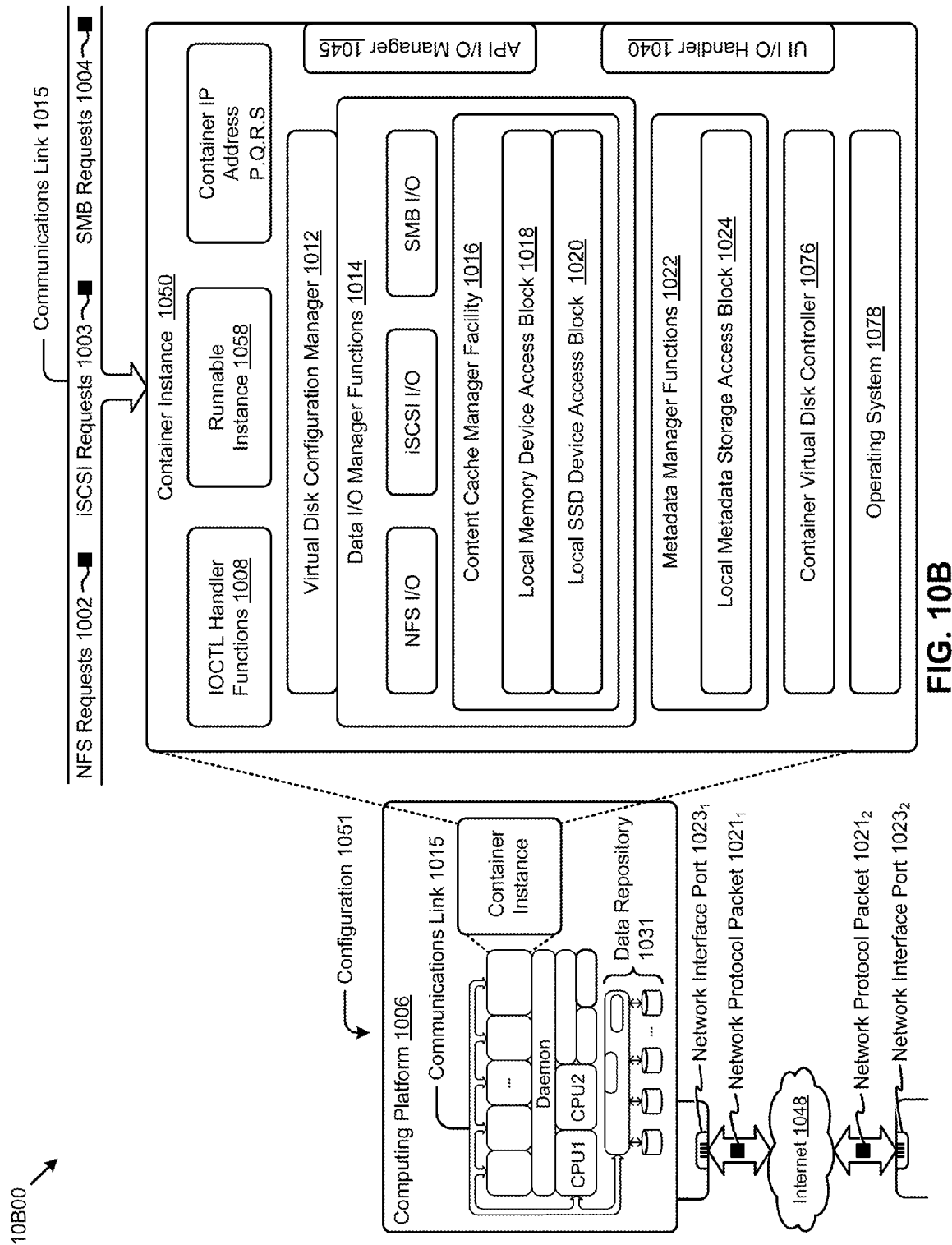

FIG. 10B depicts a containerized architecture 10B00 comprising a collection of interconnected components suitable for implementing embodiments of the present disclosure and/or for use in the herein-described environments. The shown containerized architecture 10B00 includes a container instance in a configuration 1051 that is further described as pertaining to the container instance 1050. The configuration 1051 includes a daemon (as shown) that performs addressing functions such as providing access to external requestors via IP address (e.g., "P.Q.R.S", as shown), a protocol specification (e.g., "http:") and possibly port specifications. The daemon can perform port forwarding to the container. A container can be rooted in a directory system, and can be accessed by file system commands (e.g., "ls" or "ls-a", etc.). The container might optionally include an operating system 1078, however such an operating system need not be provided. Instead, a container can include a runnable instance 1058, which is built (e.g., through compilation and linking, or just-in-time compilation, etc.) to include all of the library and OS-like functions needed for execution of the runnable instance. In some cases, a runnable instance can be built with a virtual disk configuration manager, any of a variety of data IO management functions, etc. In some cases, a runnable instance includes code for, and access to a container virtual disk controller 1076. Such a container virtual disk controller can perform any of the functions that the aforementioned CVM virtual disk controller 1026, yet such a container virtual disk controller does not rely on a hypervisor or any particular operating system in order to perform its range of functions.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings to be regarded in an illustrative sense rather than in a restrictive sense.

What is claimed is:

1. A method for managing a reconfigurable data structure, the method comprising:
    configuring, at a virtual machine above a hypervisor, a first portion of a multi-level data structure to have a first area comprising reserved memory and a second area comprising reconfigurable memory, wherein the reserved memory and the reconfigurable memory are assigned to the virtual machine by the hypervisor;
    managing the multi-level data structure at the virtual machine by at least populating at least a portion of the reserved memory with pointers that address one or more portions of the second area;
    receiving a release request from the hypervisor to release some or all of the reconfigurable memory;
    reconfiguring at least a portion of the pointers to reflect release of the some or all of the reconfigurable memory from the virtual machine; and
    releasing the reconfigurable memory corresponding to the release request to the hypervisor.

2. The method of claim 1, wherein the first area comprising reserved memory is allocated via a hypervisor call, and wherein the hypervisor will not request the reserved memory be returned and the reserved memory comprises at least a highest memory tier.

3. The method of claim 1, wherein the second area comprising reconfigurable memory is allocated via a balloon memory driver call, wherein the hypervisor includes a balloon memory drive and the virtual machine includes a balloon memory driver.

4. The method of claim 1, wherein at least some of the one or more portions of the second area have different sizes, and the second area corresponds to a plurality of memory cache tiers and to a plurality of different storage mediums.

5. The method of claim 1, wherein at least one of the one or more portions of the second area comprises a set of cache entries and the set of cache entries implement a least recently used policy.

6. The method of claim 5, further comprising responding to the release request to release some or all of the reconfigurable memory by copying at least a portion of the set of cache entries in the reconfigurable memory to another location that is also composed of reconfigurable memory.

7. The method of claim 5, further comprising responding to the release request to release some or all of the reconfigurable memory by copying at least a portion of the set of cache entries in the reconfigurable memory to another location that is composed of solid state drive (SSD) storage.

8. The method of claim 1, further comprising, responding to the release request within a threshold amount of time, wherein responding to the release request comprises indicating that the release request is complete or indicating that the release request corresponds to a locked memory area.

9. The method of claim 1, further comprising waiting, after receiving the release request to release some or all of the reconfigurable memory, until any locks in the reconfigurable memory are cleared.

10. The method of claim 1, wherein the first portion of the multi-level data structure implements a linked list, and wherein a single pointer in the linked list can be updated to remove a tier from the second area.

11. A computer program, embodied in a non-transitory computer readable medium, the non-transitory computer readable medium having stored thereon a sequence of instructions which, when stored in memory and executed by a processor causes the processor to perform a set of acts, the set of acts comprising:

configuring, at a virtual machine above a hypervisor, a first portion of a multi-level data structure to have a first area comprising reserved memory and a second area comprising reconfigurable memory, wherein the reserved memory and the reconfigurable memory are assigned to the virtual machine by the hypervisor;

managing the multi-level data structure at the virtual machine by at least populating at least a portion of the reserved memory with pointers that address one or more portions of the second area;

receiving a release request from the hypervisor to release some or all of the reconfigurable memory;

reconfiguring at least a portion of the pointers to reflect release of the some or all of the reconfigurable memory from the virtual machine; and releasing the reconfigurable memory corresponding to the release request to the hypervisor.

12. The computer program of claim 11, wherein the first area comprising reserved memory is allocated via a hypervisor call, and wherein the hypervisor will not request the reserved memory be returned and the reserved memory comprises at least a highest memory tier.

13. The computer program of claim 11, wherein the second area comprising reconfigurable memory is allocated via a balloon memory driver call, wherein the hypervisor includes a balloon memory drive and the virtual machine includes a balloon memory driver.

14. The computer program of claim 11, wherein at least some of the one or more portions of the second area have different sizes, and the second area corresponds to a plurality of memory cache tiers and to a plurality of different storage mediums.

15. The computer program of claim 11, wherein at least one of the one or more portions of the second area comprises a set of cache entries and the set of cache entries implement a least recently used policy.

16. The computer program of claim 11, further comprising, responding to the release request within a threshold amount of time, wherein responding to the release request comprises indicating that the release request is complete or indicating that the release request corresponds to a locked memory area.

17. The computer program of claim 11, the set of acts further comprising waiting, after receiving the release request to release some or all of the reconfigurable memory, until any locks in the reconfigurable memory are cleared.

18. The computer program of claim 11, wherein the first portion of the multi-level data structure implements a linked list, and wherein a single pointer in the linked list can be updated to remove a tier from the second area.

19. A system comprising:

a processor;

a memory comprising computer code to be executed by the processor, in which the computer code when executed implements:

configuring, at a virtual machine above a hypervisor, a first portion of a multi-level data structure to have a first area comprising reserved memory and a second area comprising reconfigurable memory, wherein the reserved memory and the reconfigurable memory are assigned to the virtual machine by the hypervisor;

managing the multi-level data structure at the virtual machine by at least populating at least a portion of the reserved memory with pointers that address one or more portions of the second area;

receiving a release request from the hypervisor to release some or all of the reconfigurable memory;

reconfiguring at least a portion of the pointers to reflect release of the some or all of the reconfigurable memory from the virtual machine; and releasing the reconfigurable memory corresponding to the release request to the hypervisor.

20. The system of claim 19, wherein the first area comprising reserved memory is allocated via a hypervisor call, and wherein the hypervisor will not request the reserved memory be returned and the reserved memory comprises at least a highest memory tier.

* * * * *